United States Patent [19]

Robertson et al.

[11] 3,733,702
[45] May 22, 1973

[54] CHEESE VATS

[75] Inventors: Peter Struan Robertson; Raymond Bysouth, both of Palmerston North, New Zealand

[73] Assignee: New Zealand Dairy Research Institute, Fitzherbert, Palmerston North, New Zealand

[22] Filed: Aug. 23, 1971

[21] Appl. No.: 173,965

[52] U.S. Cl. ............................................99/462
[51] Int. Cl. ............................................A01j 25/02
[58] Field of Search.....................31/48, 47, 46, 89

[56] References Cited

UNITED STATES PATENTS

| | | | |
|---|---|---|---|
| 1,046,906 | 12/1912 | Veeman | 31/47 |
| 2,717,212 | 9/1955 | Hengsen et al. | 31/46 UX |
| 2,814,114 | 11/1957 | Nessler et al. | 31/48 |
| 3,019,527 | 2/1962 | McReavy | 31/48 |

Primary Examiner—Hugh R. Chamblee
Attorney—Irvin S. Thompson

[57] ABSTRACT

A cheese-making vat including a vertical tank, a plurality of agitators having shafts journalled in bearings mounted on the tank, the agitators having vertical blades arranged so as to effectively sweep almost all the volume of the tank, a wire cutter frame arranged to cover the cross-sectional area of the tank and having apertures positioned to receive the cross-sectional area of the agitator blades and their shafts when the agitators and their shafts are stopped a drive assembly arranged to move the cutter frame, a variable speed drive arranged to drive the agitator shafts a switch arranged to stop rotation of the agitators before the cutter frame is lowered prior to coagulation of the milk and subsequent cutting of the coagulum by raising the cutter within the tank.

20 Claims, 7 Drawing Figures

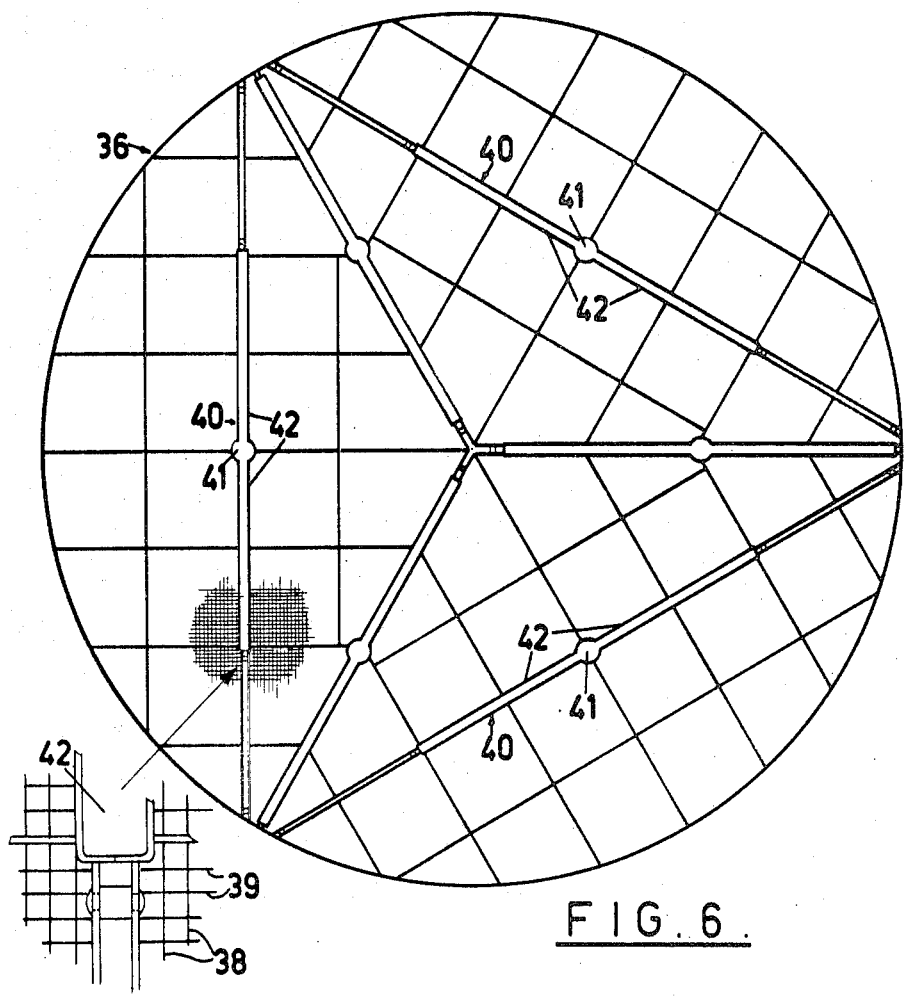

CHEESE VATS

This invention relates to improvements in vats designed for use in the production of cheese.

In the conventional process of making cheese in vats, the separation of whey starts as coagulated milk is being cut. Synersis takes place and the process of separation consists of the exudation of whey out of curd particles, followed by the draining of the exudated whey from the resulting mixture of curd and whey.

After the coagulated milk has been cut into sufficiently small reasonably uniform lumps, stirring is continued to accelerate the separation of the whey and prevent curd particles sinking to the bottom of the vat and adhering to each other. The separation of whey can be accelerated by raising the temperature of the whey-curd mixture, which is usually achieved in a double-walled vat with the aid of steam or hot water in the jacket. Stirring is continued until the curd is considered by the cheese-maker to e suitable for drawing off the whey, or curds and whey and further processing as required for the cheese variety under consideration.

In such cheese-making process it is already known to provide a mechanism including a carriage positioned to travel over a vat the carriage having a cutter arranged to cut the curd into small pieces and a mechanical agitator to subsequently agitate the pieces. It is also known to provide a vertical vat in which cutters and agitators are individually employed and normally removed from the vat after use.

The main object of the present invention is to provide a novel form of cheese-making vat having such a construction that cutter and agitator elements are permanently installed within the vat and combined with a mechanism whereby cutting and agitating of cheese curds are automatically controlled and effected.

Accordingly the invention consists of a cheese-making vat including a vertical tank, a plurality of agitators having shafts journalled in bearings mounted on the tank, the agitators having vertical blades arranged so as to effectively sweep almost all the volume of the tank, a wire cutter frame arranged to cover the cross-sectional area of the tank and having apertures positioned to receive the cross-sectional area of the agitator blades and their shafts when the agitators and their shafts are stopped, a drive assembly arranged to move the cutter frame, a variable speed drive arranged to drive the agitator shafts and a switch arranged to stop rotation of the agitators before the cutter frame is lowered prior to coagulation of the milk and subsequent cutting of the coagulum by raising the cutter within the tank.

In further describing the construction and function of the invention, reference will be made hereinafter to the accompanying drawings, in which:

FIG. 5 is an elevation and

FIG. 6 is a plan of the wire cutter frame;

FIG. 7 is a scrap view of a typical joint area of an end of one of the apertures as indicated by the arrow shown in FIG. 6.

Figure 1:
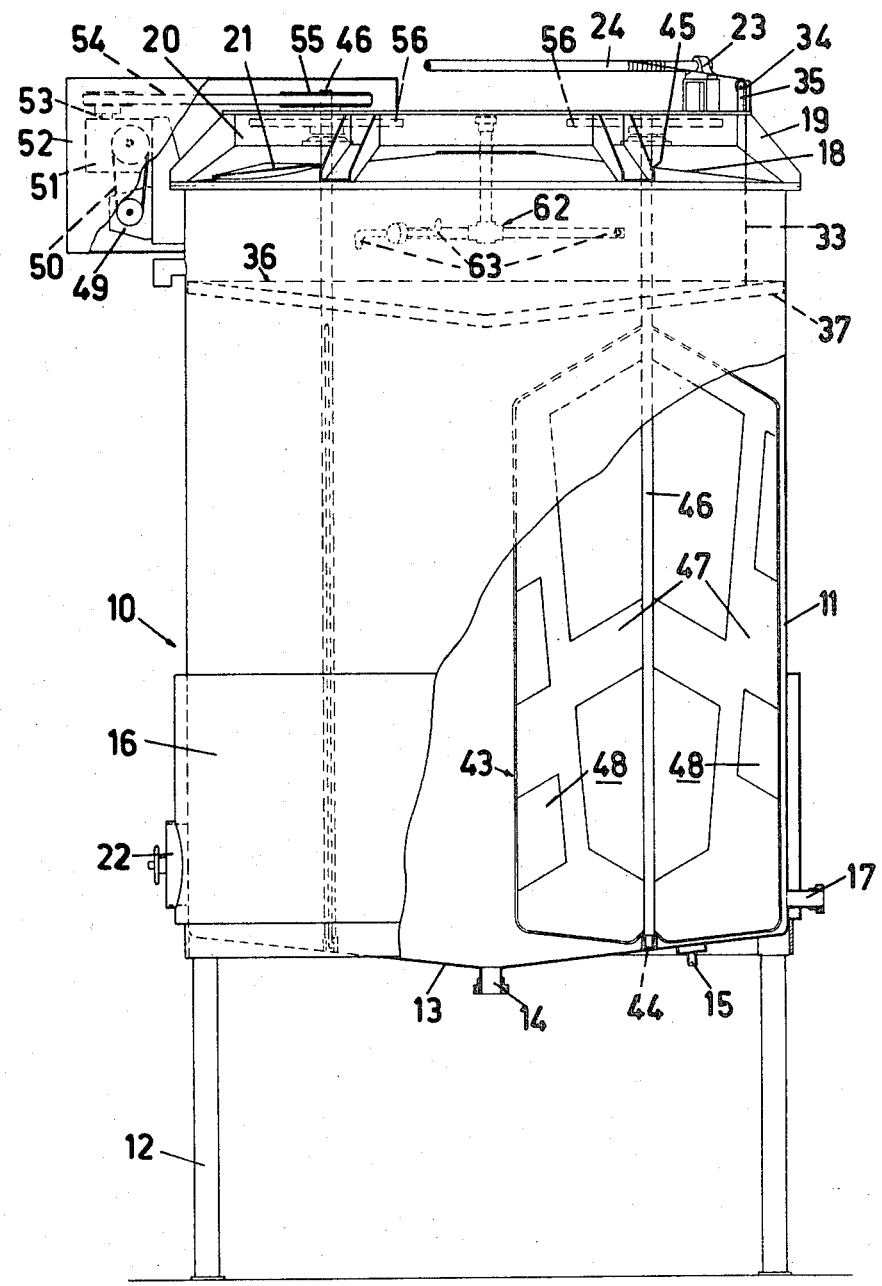
FIG. 1 is an elevation, with a lower part of the tank cut away and an upper part of the mechanism broken.
Figure 3:
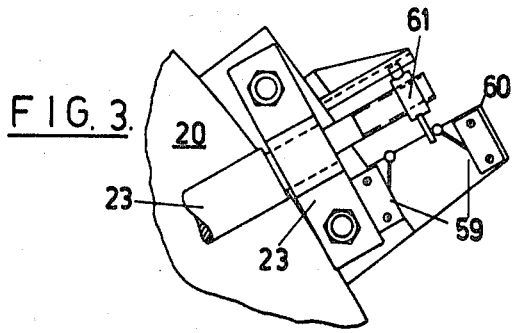
FIG. 3 is a detail view taken at the circle 3 in FIG. 2.
Figure 2:
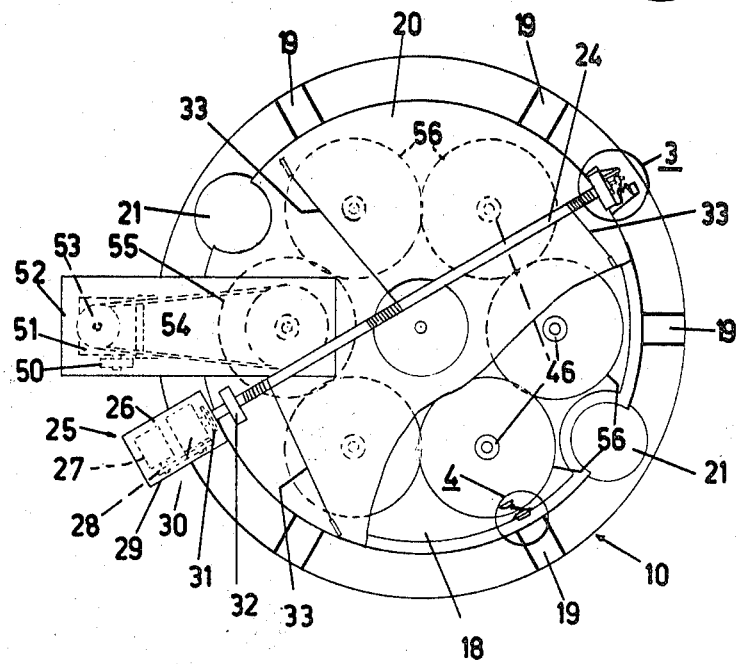
FIG. 2 is a plan with part of the tank top cut away.
Figure 4:
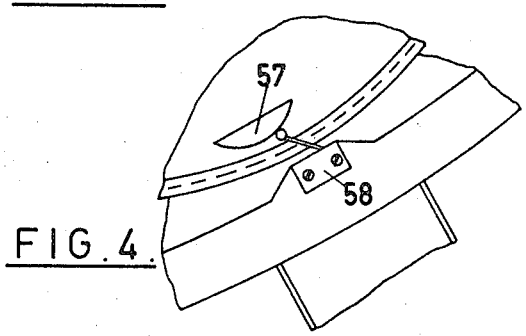
FIG. 4 is a detail view taken at the circle 4 in FIG. 2.

In giving effect to the invention the cheese tank 10 is of a vertical cylindrical shape and of a predetermined volumetric capacity. For instance the tank 10 can be of about 9 feet internal diameter and about 9 feet liquid depth thus providing for some 3500 gal. capacity. This tank body 11 is supported on a base framing 12 which may be enclosed by a peripheral skirt (not shown).

A floor or bottom end 13 of the tank body 11 is coned in a shallow configuration to a central outlet 14 such as having a fall thereto of about 4 inches. In the floor 13 of the tank a series of steam diffusers 15 are arranged to provide direct heating of he curd and whey mixture; alternatively the vat may be indirectly heated, for example, by a hot water jacket 16 attached to the side or bottom of the vat. A larger milk inlet 17 is also provided through the tank wall near the bottom.

The top of the tank is covered by a shallow coned lid 18 which is strengthened by radial gusset plates 19 to support a top frame 20 extending over a main area of the lid 18. Both the tank 11 and its lid 18 are fabricated out of a suitable gauge stainless steel, the lid having a detachable covered manhole or access-hole 21. In addition a manhole 22 is incorporated on the side or floor of the vat body 11 to permit admission below the cutter.

Upon the support frame 20 are located bearing blocks 23 arranged in horizontal axial alignment and such axis may be offset to the center of the tank. These blocks 23 journal a shaft, 24 an outer end of which is connected to a drive assembly 25 disposed within a housing 26 mounted on the said support frame. Conveniently this drive assembly 25 comprises an electric motor 27 having a spindle 28 coupled through an endless transmission 29 to a gear reduction unit 30 which has its output spindle 31 connected through a flexible coupling 32 to the projecting end of the off-set horizontal shaft 24.

This shaft 24 is designed to act as a winding member for flexible connections suspending the cutter frame inside the tank body. Suitably the flexible connections comprise lengths of flexible stainless steel ribbon or ropes 22 made of nylon-coated stranded flexible stainless steel wire, each having one end anchored to the winging shaft 24, the rope or ribbon led over a guide pulley 34 carried by brackets 35 mounted on the vat towards the periphery of the lid support frame 20, down through an eyelet or sleeve positioned in the lid 18 and the other end attached towards the periphery of the cutter frame.

This cutter frame 36 constructed as a whole or number of sub-sections is circular in plan to be a sliding fit inside the cylindrical tank body 11; and the frame 36 has a cross-sectional shape so that it fits the cross-sectional shape of the coned bottom end 13 of the tank. A peripheral rim member 37 of the cutter frame mounts an array of tensioned fine wires 38 extending in one almost horizontal direction and a further array of tensioned fine wires 39 extending in an opposite almost horizontal direction, in a tennis-racquet like fashion but not necessarily interwoven. These wires 38, 39 are located in narrow slots or holes to the underside of the frame 36 so that they essentially follow the contour of the bottom and come almost in contact with the vat floor 13 when the cutter is in its lowest position. The wires 38,39 are fine, i.e. small gauge, stainless steel and are closely arranged together to suit the size of pieces required in the cutting of the milk coagulum.

An important feature is the provision of the apertures 40 in the cutter frame 36 to take the cross-section of the respective agitator blades and shafts. In this instance, each aperture 40 consists of a central hole 41 and two diametrically opposed slots 42 opening into this central hole to suit a stopping position of the particular agitator and of dimensions to freely pass over the agitators during raising or lowering.

An agitator 43 is provided for each so-formed aperture 40 in the cutter frame 36. For each agitator bearings are provided, one being a bearing 44 mounted on the floor 11 of the tank 10 and the other a thrust and journal bearing 45 mounted on the lid support 18 in vertical alignment. There are six pairs of these bearings aligned vertically with the central holes 41 in the cutter frame although more or less agitators and bearings may be used. A shaft 46 of each agitator 43 is journalled in its own pair of bearings, with the upper end of the agitator shaft projecting above its top bearing 45. The upper end of the shaft where it passes through the vat lid is sealed with an automotive or other suitable type oil seal, so that any foreign matter shed by the bearing, drives, etc. cannot gain access to the milk within the vat.

Each agitator 43 includes agitator blades 47 of fin nature extending substantially from the bottom to above the liquid level of the tank, that is to just below a level assumed by the cutter frame 36 when lifted to its terminal or non-operative height in the tank. These blades 47 extend diametrically along the agitator shaft and are accommodated by the slots 42 of the particular aperture 40 in the cutter frame 36. Each blade 47 formed is made of plates so spaced as to provide openings 48 over its area enlarging from its lower end so as to create a lessening agitating action towards the upper areas of the tank. In addition to agitation each blade 47 serves to break the rectangular columns of curd formed by the cutter to an approximately uniform size.

The drive for the agitator shafts 46 is taken from an electric brake-motor 49 by an endless transmission 50 through a variable speed gearbox 51 disposed within a further housing 52 mounted on the side of the lid 18 and its support frame 20. The output 53 is connected through an endless transmission 54 to a gear 55 mounted on the projecting end of the particular agitator shaft 46. The upper end of each agitator shaft 46 carries a large diameter gear 56 which intermeshes with those on two other shafts (46) to that each agitator shaft is coupled and driven to rotate in contra-direction to neighboring shafts.

A cam 57 is located on one of the gears 56 so as to actuate the switch being a micro-switch 58 electrically connected to the drive motor 49 so as to precisely control the stopping position of the agitator shafts 46 through the train of gears thus ensuring alignment of the agitator blades 43 with the apertures 40 in the cutter frame 36. Two further micro-switches 59 are arranged upon a bracket 60 for actuation by an adjustable member 61 mounted on the respective end of and for controlling the winding member 24.

Above the cutter frame 36 at its elevated position is a central inplace cleaning rotor 62 including a number of nozzles 63 arranged to effectively distribute wash water and/or detergent about the vat, 10, the cutter frame 36, and agitators 43 when the rotor 62 is coupled to a pressurized supply source.

In operation in the general process of cheese making mentioned at the outset of this specification the rennet is stirred into the milk by the agitators 43 which are then stopped by the cam 57 on one of the gear wheels on an agitator shaft 46 actuating the microswitch 58 to stop the agitator drive motor 49. Before the milk has coagulated the cutter frame 36 is lowered past the stopped agitators 43 to the floor 13 of the tank 10. When the milk has coagulated the motor 27 for the cutter frame 36 is re-started and the cutter frame is now raised, its specially-shaped apertures 48 allowing free movement up the stopped agitators 46 and their fixed blades 43, by its lift ropes 33 winding on to the driven shaft 24, and the wires 38, 39 of the cutter frame 36 cut the curd into square columns as it rises through the coagulum.

After the cutter frame 36 has reached the end of its cutting stroke, above the maximum permitted curd level, the agitators 43 are rotated at a low speed so that the mass it stirred to break the columns of curd and to accelerate the separation of the whey and prevent curd particles sinking to the bottom of the tank 10 and adhering to one another. To accelerate the expulsion of whey from the curd clean steam an be injected through the bottom diffusers 15 to cook the curd.

Alternatively the tank 10 is water-jacketed to provide for an indirect method of cooking the curd and preferably legged by an external outer wall of thermal insulating material. The tank and all its internal parts except gears, bearings, motors, etc., are made of stainless steel.

What is claimed is:

1. A cheese-making vat including a vertical tank, a plurality of agitators having shafts journalled in bearings mounted on the tank, the agitators having vertical blades arranged so as to effectively sweep almost all the volume of the tank, a wire cutter frame arranged to cover the cross-sectional area of the tank and having apertures positioned to receive the cross-sectional area of the agitator blades and their shafts when the agitators and their shafts are stopped, a drive assembly arranged to move the cutter frame, a variable speed drive arranged to drive the agitator shafts and a switch arranged to stop rotation of the agitators before the cutter frame is lowered prior to coagulation of the milk and subsequent cutting of the coagulum by raising the cutter within the tank.

2. A cheese-making vat as claimed in claim 1 wherein the cutter frame is constructed as a whole or a number of sub-sections and is shaped in plan so as to be an almost sliding fit inside the tank, and the frame further having a cross-sectional shape so that it fits the cross-sectional shape of a coned bottom end or floor of the tank.

3. A cheese-making vat as claimed in claim 1 wherein a peripheral rim member of the cutter frame mounts on its wires as one array of tensioned fine wires extending in one almost horizontal direction, and a further array of tensioned fine wires extending in an opposite almost horizontal direct-ion, as in a tennis racquet like fashion.

4. A cheese-making vat as claimed in claim 3 wherein the wires are secured in narrow slots or holes on the underside of the cutter frame so that they essentially follow the contour of the bottom and come almost in contact with the tank's floor when the cutter is at its lowest position.

5. A cheese-making vat as claimed in claim 1 wherein apertures are provided in the cutter frame so as to take the cross-section of the respective agitator blades and shafts.

6. A cheese-making vat as claimed in claim 5 wherein each aperture consists of a central hole and two diametrically opposed slots opening into the central hole, the slots being so positioned as to suit a stopping position of the particular agitator and of dimensions to pass freely over the agitators during raising or lowering.

7. A cheese-making vat as claimed in claim 1 wherein each agitator includes agitator blades of fin nature extending substantially from the bottom to above the liquid level of the tank, to just below a level assumed by the cutter frame when lifted to its terminal or non-operative height in the tank.

8. A cheese-making vat as claimed in claim 7 wherein the agitator blades extend diametrically along the agitator shaft and are accommodated by the slots of the particular aperture in the cutter frame.

9. A cheese-making vat as claimed in claim 8 wherein each agitator blade is made of plate so spaced as to provide openings over its area enlarging from its lower end so as to creates a lessening agitating action towards the upper areas of the tank and break the curd columns to an approximate uniform size.

10. A cheese-making vat as claimed in claim 1 wherein the wires are of small gauge stainless steel and closely arranged together to suit the size of pieces required in the cutting of the milk coagulum.

11. A cheese-making vat as claimed in claim 1 wherein in the floor of the tank a series of steam diffusers are arranged to provide for direct heating of the curd and whey mixture.

12. A cheese-making vat as claimed in claim 1 wherein a milk inlet is provided through the tank wall near its bottom.

13. A cheese-making vat as claimed in claim 1 wherein upon a top support frame are located bearing blocks arranged in horizontal axial alignment and a shaft journalled in the blocks with an outer end of the shaft connected to the variable speed drive disposed within a housing mounted on the support frame.

14. A cheese-making vat as claimed in claim 13 wherein the drive comprises an electric motor having a spindle coupled, through endless transmission and/or to a gear reduction unit which has an output spindle connected through a flexible coupling to a projecting end of the horizontal shaft.

15. A cheese-making vat as claimed in claim 14 wherein the horizontal shaft is provided to act as a winding member for flexible connections suspending the cutter frame inside the tank.

16. A cheese-making vat as claimed in claim 15 wherein the flexible connections comprise lengths of flexible stainless steel ribbon or ropes made of nylon-coated stranded flexible stainless steel wire, each connection having one end anchored to the winding member, the ribbon or rope being led over a guide pulley carried by brackets mounted on the support frame near its periphery, down through an eyelet or sleeve positioned on a tank lid and the other end attached to the cutter frame towards its periphery.

17. A cheese-making vat as claimed in claim 1 wherein the bearings for each agitator shaft are provided one mounted on the floor of the tank and another is a thrust end journal bearing mounted on a tank lid support frame.

18. A cheese-making vat as claimed in claim 17 wherein there are six pairs of these bearings aligned vertically with the central holes in the cutter frame, a shaft of a particular agitator being journalled in its own pair of bearings with an upper end of each agitator shaft projecting above its top bearing.

19. A cheese-making vat as claimed in claim 18 wherein the projecting end of each agitator shaft carries a larger gear which intermeshes with gears on two other shafts so that all agitator shafts are coupled and driven to rotate in contra-direction to neighboring shafts.

20. A cheese-making vat as claimed in claim 1 wherein above the cutter frame at its elevated position is a central inplace cleaning rotor including a number of nozzles arranged to effectively distribute wash water and/or detergent about the inside of the tank, the cutter frame and the agitators when the rotor is coupled to a pressurized liquid supply source.

* * * * *